United States Patent
Kearney

(10) Patent No.: US 10,259,427 B1
(45) Date of Patent: Apr. 16, 2019

(54) VEHICLE SECURITY SYSTEM USING SENSOR DATA

(71) Applicant: Robert Bosch GmbH, Stuttgart (DE)

(72) Inventor: Norbert Wolfgang Kearney, Wuestenrot (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 15/730,406

(22) Filed: Oct. 11, 2017

(51) Int. Cl.
*B60R 25/30* (2013.01)
*B60R 25/10* (2013.01)
*B60R 25/20* (2013.01)

(52) U.S. Cl.
CPC .......... *B60R 25/10* (2013.01); *B60R 25/1003* (2013.01); *B60R 25/20* (2013.01); *B60R 25/30* (2013.01); *B60R 25/305* (2013.01)

(58) Field of Classification Search
CPC ....... B60R 25/00; B60R 25/001; B60R 25/10; B60R 25/1003; B60R 25/1004; B60R 25/20; B60R 25/2009; B60R 25/30; B60R 25/31; B60R 25/34; G08B 21/18; G08B 21/22; G08B 29/18; G08B 29/185; B60N 2/00
See application file for complete search history.

(56) References Cited

U.S. PATENT DOCUMENTS

| | | | | |
|---|---|---|---|---|
| 4,922,224 A * | 5/1990 | Drori | ................... | B60R 25/1004 340/426.25 |
| 5,157,375 A * | 10/1992 | Drori | ................... | B60R 25/1004 340/426.17 |
| 7,064,657 B2 | 6/2006 | Becker et al. | | |
| 8,818,725 B2 | 8/2014 | Ricci | | |
| 9,809,196 B1 * | 11/2017 | Penilla | ................... | H04N 7/181 |
| 9,953,230 B2 * | 4/2018 | Nicol | ................. | G06K 9/00838 |
| 2005/0151628 A1 | 7/2005 | Becker et al. | | |
| 2013/0041623 A1 * | 2/2013 | Kumar | ................... | G01C 21/14 702/158 |
| 2013/0267194 A1 | 10/2013 | Breed | | |
| 2013/0295912 A1 | 11/2013 | Chen | | |
| 2015/0286882 A1 | 10/2015 | Nicol | | |
| 2016/0014585 A1 | 1/2016 | Sundararaj et al. | | |
| 2016/0129883 A1 * | 5/2016 | Penilla | ................... | B60R 25/305 348/148 |
| 2016/0182701 A1 | 6/2016 | Kang et al. | | |
| 2016/0214535 A1 * | 7/2016 | Penilla | ................... | G06Q 20/18 |

FOREIGN PATENT DOCUMENTS

WO 2017155448 A1 9/2017

* cited by examiner

*Primary Examiner* — Van T Trieu
(74) *Attorney, Agent, or Firm* — Michael Best & Friedrich LLP

(57) ABSTRACT

A method and system for monitoring a vehicle for security. The method includes determining when a trigger event occurs to the vehicle based on a first input from a first sensor and activating a second sensor of the vehicle in response to the trigger event. An electronic processor then determines whether a person is local to the vehicle based on the second sensor, and generates a record of activity of the person based on the second sensor when the person is local to the vehicle.

18 Claims, 4 Drawing Sheets

VEHICLE SECURITY SYSTEM USING SENSOR DATA

BACKGROUND

Some modern vehicles include security systems that provide audial warnings when a break-in attempt of the vehicle is detected. These systems may use sirens, klaxons, verbal warnings, and flashing lights. In some security systems, the owner of the vehicle is notified when a break-in attempt is detected.

To detect break-in attempts to the vehicle, security systems may use motion sensors, shock sensors, mercury switches, and the like. However, these sensors may be overly sensitive to external perturbations. As a consequence, the security systems may trigger false alarms. The security systems may be inadvertently triggered from passing vehicles, thunder storms, loud noises, and other events.

SUMMARY

Embodiments described in this disclosure provide a security system that uses multiple sensors to sense conditions of the vehicle and an area local to the vehicle and prevents false alarms that occur in the security systems described above. In particular, the security system automatically senses, analyzes, and alerts a vehicle owner of potential security threats to a vehicle. Additionally, the system and methods described herein reduce power consumption of the security system and thereby allow the security system to be active for extended periods of time while the vehicle is parked. The security system operates in a low-power state using only low-power sensors until the security system activates. When the low-power sensors detect a disturbance to the vehicle, the system activates additional sensors and determines whether or not to initiate an alarm notification.

In particular, one embodiment provides a method of monitoring a vehicle for security. The method includes the steps of determining when a trigger event occurs to the vehicle based on a first input from a first sensor and activating a second sensor of the vehicle when the trigger event has occurred. The method further includes determining whether an alarm event has occurred based on a second input from the second sensor and generating a notification indicative of occurrence of the alarm event when the alarm event has occurred. The method also includes the step of deactivating the second sensor of the vehicle when no alarm event has occurred.

Another embodiment provides a system for monitoring a vehicle for security. The system includes a first sensor, a second sensor, and an electronic processor communicatively connected to the first sensor and the second sensor. The electronic processor is configured to determine when a trigger event occurs to the vehicle based on a first input from a first sensor and activate a second sensor of the vehicle when the trigger event has occurred. The electronic processor is further configured to determine whether an alarm event has occurred based on a second input from the second sensor, to generate a notification indicative of occurrence of the alarm event when the alarm event has occurred, and to deactivate the second sensor of the vehicle when no alarm event has occurred.

Other aspects, features, and embodiments will become apparent by consideration of the detailed description and accompanying drawings.

DETAILED DESCRIPTION

Before any embodiments are explained in detail, it is to be understood that this disclosure is not intended to be limited in its application to the details of construction and the arrangement of components set forth in the following description or illustrated in the following drawings. Embodiments are capable of other configurations and of being practiced or of being carried out in various ways.

A plurality of hardware and software based devices, as well as a plurality of different structural components may be used to implement various embodiments. In addition, embodiments may include hardware, software, and electronic components or modules that, for purposes of discussion, may be illustrated and described as if the majority of the components were implemented solely in hardware. However, one of ordinary skill in the art, and based on a reading of this detailed description, would recognize that, in at least one embodiment, the electronic based aspects of the invention may be implemented in software (for example, stored on non-transitory computer-readable medium) executable by one or more processors. For example, "control units" and "controllers" described in the specification can include one or more electronic processors, one or more memory modules including non-transitory computer-readable medium, one or more input/output interfaces, one or more application specific integrated circuits (ASICs), and various connections (for example, a system bus) connecting the various components.

Figure 1:
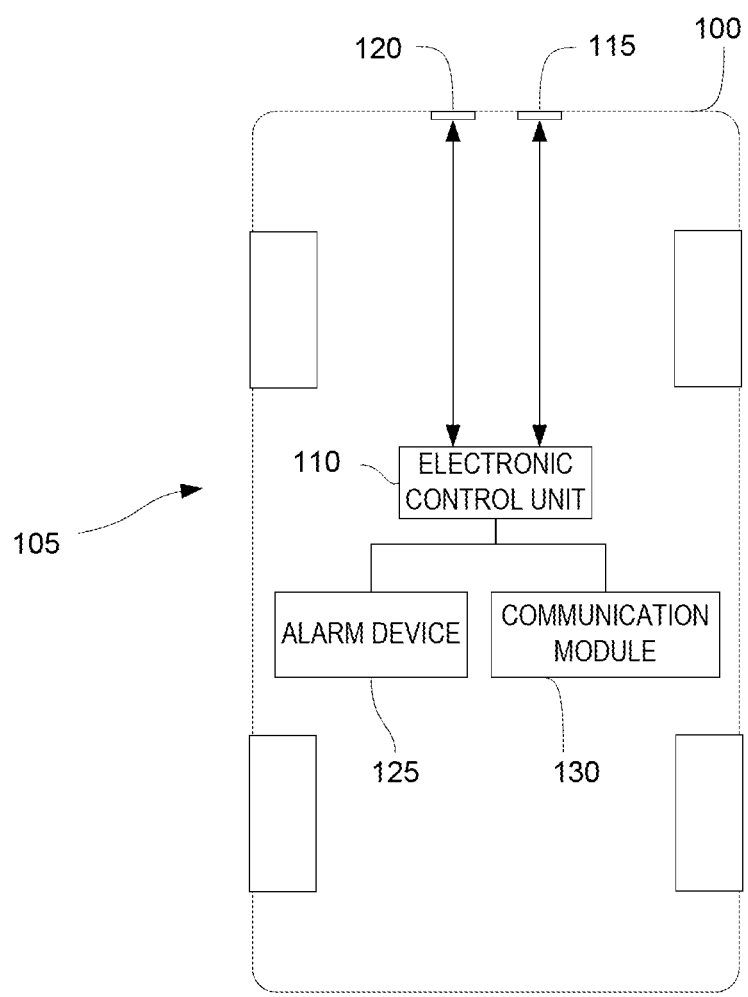
FIG. 1 is a block diagram of a vehicle equipped with a security system according to one embodiment.

FIG. 1 illustrates a vehicle 100 equipped with a security system 105 according to one example. The security system 105 is configured to determine whether any events occur to the vehicle 100 that pose a security risk or damage to the vehicle 100 while maintaining an overall low-power draw. The vehicle 100, although illustrated as a four-wheeled vehicle, encompasses various types and designs. For example, the vehicle 100 may be an automobile, a motorcycle, a truck, a bus, a semi-tractor, and others.

In the example illustrated, the security system 105 includes an electronic control unit (ECU) 110, a first sensor 115, a second sensor 120, an alarm device 125, and a communication module 130. The electronic control unit 110 may be communicatively connected to the first sensor 115, the second sensor 120, the alarm device 125, and the communication module 130 via various types of connections and using various types of communication protocols. For example, the electronic control unit 110, the first sensor 115, the second sensor 120, the alarm device 125, and the communication module 130 may be directly wired, wired through a communication bus, or wirelessly connected (for example, via a wireless network).

The electronic control unit 110 is configured to, among other things, receive a first input (i.e., sensor data) from the first sensor 115 indicative of whether the vehicle 100 is experiencing any disturbances. The electronic control unit 110 is also configured to receive a second input from the second sensor 120 indicative of conditions occurring to and around the vehicle 100. In some embodiments, the electronic control unit 110 is configured to record information received from the first sensor 115 and the second sensor 120, to analyze the information, to generate notifications to send to the alarm device 125, and to communicate with external devices via the communication module 130.

The first sensor 115 is a low-power sensor that operates when the vehicle is turned off. For example, the first sensor 115 may be an acceleration sensor or vibration sensor. The security system 105 may thereby detect a break-in attempt via the first sensor 115 that results in vibrations or acceleration occurring to the vehicle 100. In this instance, the first sensor 115 detects slight movements, and the electronic control unit 110 analyzes the first input to determine whether these slight movements are likely to be a break-in attempt based on the analysis. In another example, the security system 105 may detect an impact that results in vibrations or acceleration occurring to the vehicle 100. In this instance, the first sensor 115 detects the impact, and the electronic control unit 110 analyzes the first input to determine whether the impact was likely to be from another vehicle colliding with the vehicle 100 or from an object striking the vehicle 100. In either case, the first input signals the electronic control unit 110 to activate the second sensor 120.

The first sensor 115, although illustrated as a single sensor for simplicity, may include multiple sensors and various types and styles of sensors. For example, the first sensor 115 may include one or more sensors or sensor arrays that are configured to sense vibration, movement, impact, and other disturbances occurring to the vehicle 100. In some embodiments, the first sensor 115 is a low-power, accelerometer for detecting small movements of the vehicle 100. In other embodiments, the first sensor 115 is a low-power, shock sensor for detecting impacts to the vehicle 100. In either case, the first sensor 115 is configured to operate continuously using small amounts of power from a power source of the vehicle 100 while the vehicle 100 is turned off.

The second sensor 120 is configured to obtain more detailed information than the first sensor 115. For example, the second sensor 120 may include a video camera, a radar sensor, a lidar sensor, an ultrasound sensor, an infrared sensor, or a combination of the foregoing. The second sensor 120 may generate multiple images of the same type or of different types of the area around the vehicle 100 whether the images are optical, radar, lidar, ultrasound, or infrared images. The second sensor 120, being an active sensor, draws more power from the power source of the vehicle 100 than the first sensor 115. In one particular configuration, the second sensor 120 is a video camera with a wide-angle lens that is configured to capture a field of view outside the vehicle 100. In some embodiments, the second sensor 120 captures a field of view that includes the interior of the vehicle 100. The second sensor 120 may be positioned with a field of view that encompasses particular areas of interest around the vehicle 100 including doors, windows, bumpers, and internal portions of the vehicle 100.

The second sensor 120, although illustrated as a single sensor for simplicity, may include multiple sensors of the types listed above. For example, the second sensor 120 may include multiple wide-angle lens cameras that provide a 360 degree field of view around the vehicle 100. In one configuration, the second sensor 120 may include 4 wide angle lens cameras positioned on each side of the vehicle 100. In some embodiments, the second sensor 120 includes multiple sensors of different types each with a field of view of the same area to improve detection of the area. In this case, the electronic control unit 110 compares images provided by the different types of sensors to capture information and features within the images that are not available using solely a single type of sensor.

The alarm device 125 is configured to generate various alarms in response to detection of alarm conditions by the security system 105. For example, the alarm device 125 is configured to generate an alarm (for example, an audial or visual car alarm) based on a request for activation by the electronic control unit 110. The alarm device 125 may, for example, activate the lights of the vehicle 100, the horn of the vehicle 100, or both when an alarm signal is received from the electronic control unit 110.

The communication module 130 is configured to transmit various notifications relating to the security system 105 to an owner of the vehicle 100 or to a central alarm monitoring service. For example, the communication module 130 may transmit various status indications including activation of the second sensor 120, activation of the alarm device 125, or both. The communication module 130 may also transmit a notification indicating an alarm condition without the electronic control unit 110 activating the alarm device 125. In some cases, the notification is transmitted to a mobile device via a cellular or other wide area network. The notification may include an alarm message that indicates when a threat to the vehicle 100 has been detected. In some embodiments, the communication module 130 may be configured to transmit sensor data captured with the first sensor 115, the second sensor 120, or both to the mobile device or the alarm monitoring service. In particular, the communication module 130 may transmit an image or video captured with the second sensor 120. In some embodiments, the communication module 130 may also receive instructions from the mobile device for the security system 105. For example, the communication module 130 may receive instructions to shut down the security system 105, turn on or off the second sensor 120 (e.g., enter into a sleep mode or an awake mode respectively), turn on or off the alarm device 125, or some combination of the foregoing.

Figure 2:
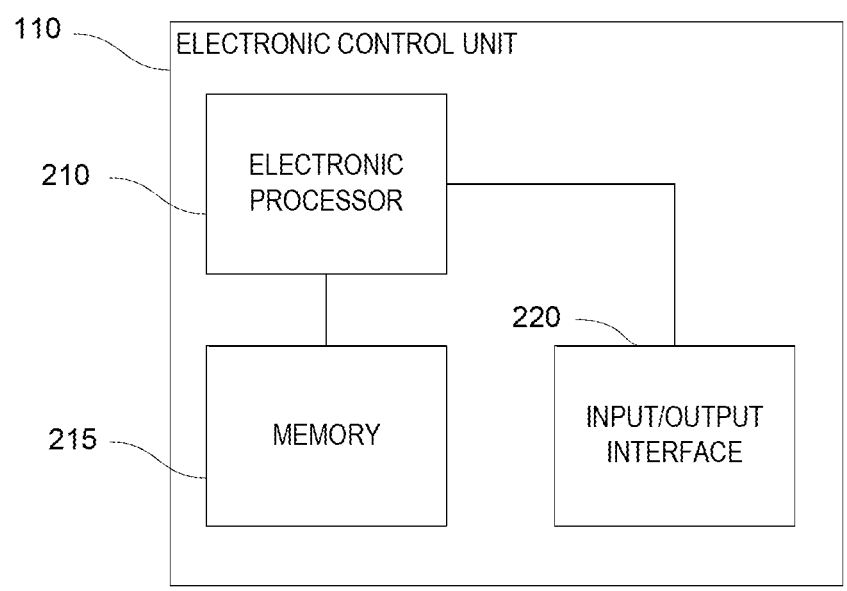
FIG. 2 is a block diagram of an electronic control unit of the security system of FIG. 1 according to one embodiment.

FIG. 2 is a block diagram of an electronic control unit 110 of the security system 105 according to one embodiment. The electronic control unit 110 includes a plurality of electrical and electronic components that provide power, operational control, and protection to the components and modules within the electronic control unit 110. The electronic control unit 110 includes, among other things, an electronic processor 210 (such as a programmable electronic microprocessor, microcontroller, or similar device), a memory 215 (for example, non-transitory, machine readable memory), and an input/output interface 220. In some embodiments, the electronic control unit 110 includes additional, fewer, or different components. For example, the electronic control unit 110 may be implemented in several independent electronic control units or modules each configured to perform specific steps or functions of the electronic control unit 110.

The electronic processor 210, in coordination with the memory 215, the input/output interface 220, and other components of the electronic control unit 110, is configured to perform the processes and methods discussed herein. For example, the electronic processor 210 is configured to retrieve from memory 215 and execute, among other things, instructions related to receiving sensor data from the first sensor 115 and the second sensor 120, analyzing the sensor data, and generating a signal to activate and control the alarm device 125. The input/output interface 220 may include one or more input and output modules for communicating with the other components of the security system 105 as well as other components of the vehicle 100. For example, the input/output interface 220 is configured to communicate with the first sensor 115, the second sensor 120, and the alarm device 125.

Figure 3:
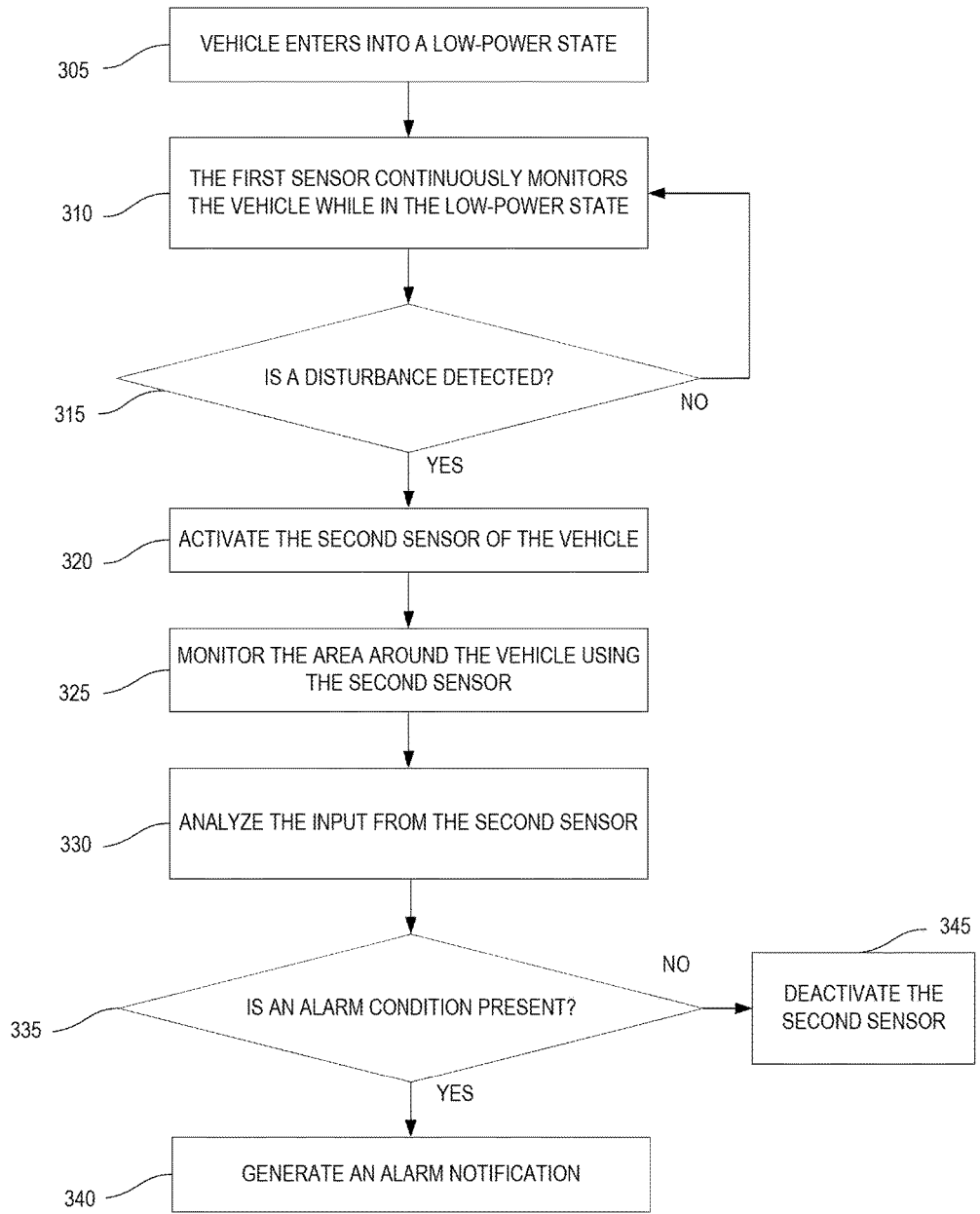
FIG. 3 is a flowchart of a method of operating the security system of FIG. 1 according to one embodiment.

FIG. 3 is a flowchart of a method of operation of the security system 105 according to one embodiment. In the illustrated embodiment, the vehicle 100 first enters into a low-power state (block 305). The low-power state is entered into when the vehicle 100 is turned off (i.e., when the ignition switch of the vehicle 100 is switched to the "off" position). In the low-power state, vehicle components that are normally active when the vehicle 100 is operating do not draw power from the power source to conserve battery power. For example, the second sensor 120 does not draw power while the vehicle 100 is in the low-power state. The first sensor 115, however, remains active when the vehicle 100 is in the low-power state. As discussed above, the first sensor 115 operates using low levels of electrical power from the battery.

The first sensor 115 continuously monitors the vehicle 100 while the vehicle 100 is in the low-power state (block 310). Based on the first sensor 115, the security system 105 detects whether a disturbance is occurring to the vehicle 100 (block 315). In some embodiments, the first sensor 115 independently (according to programming of the first sensor 115) determines whether a disturbance is occurring to the vehicle 100. In this instance, the electronic processor 210 remains in an idle state until a disturbance is detected by the first sensor 115. Once a disturbance is detected, the electronic processor 210 activates (i.e., wakes up) based on a signal from the first sensor 115.

In other embodiments, the electronic processor 210 stays active when the vehicle 100 is in the low-power state. In this instance, the electronic processor 210 continuously monitors the first sensor 115 to determine whether a disturbance has occurred. For example, the electronic processor 210 may compare a signal received from the first sensor 115 to a triggering threshold and take action (as described below) when the received signal is greater than the triggering threshold. In some embodiments, the electronic processor 210 requires detection of the disturbance over a minimum period of time before taking action. For example, the electronic processor 210 may require that the received signal from the first sensor 115 remain above the triggering threshold for one or more seconds before taking action.

When a disturbance is detected, the electronic processor 210 activates the second sensor 120 of the vehicle 100 (block 320). Once activated, the electronic processor 210 receives an input from the second sensor 120. The electronic processor 210 monitors the area around the vehicle 100 for activity occurring local to the vehicle 100 using the second sensor 120 (block 325). The electronic processor 210 then analyzes the input from the second sensor 120 (block 330). The electronic processor 210 determines whether an alarm condition is present based on the analysis of the input from the second sensor 120 (block 335). When an alarm condition is present, the electronic processor 210 generates an alarm notification (block 340). Conversely, when an alarm condition is not present, the electronic processor 210 deactivates the second sensor 120 (block 345). Deactivation of the second sensor 120 may occur after a predetermined period of time as described below.

In analyzing the input from the second sensor 120, the electronic processor 210 may evaluate various and multiple parameters. For example, the electronic processor 210 may detect particular features within images supplied by the second sensor 120 and determine whether these features are indicative of an alarm condition. For example, the electronic processor 210 may determine whether features within the image indicate the presence of an object, a person, or another vehicle. The electronic processor 210 may determine where an object is located relative to the vehicle 100, and whether the object poses a security risk or has caused damage to the vehicle 100. For example, the images may show that body damage has occurred to the vehicle 100 including a broken window, a dent, a scrape, and other types of damage. In some embodiments, the electronic processor 210 may analyze the image to detect and determine the location of objects within the image. When these objects are in physical contact with the vehicle 100 or within a minimum range from the vehicle 100 (for example, closer than 1 foot), the electronic processor 210 may generate the alarm notification.

Figure 4:
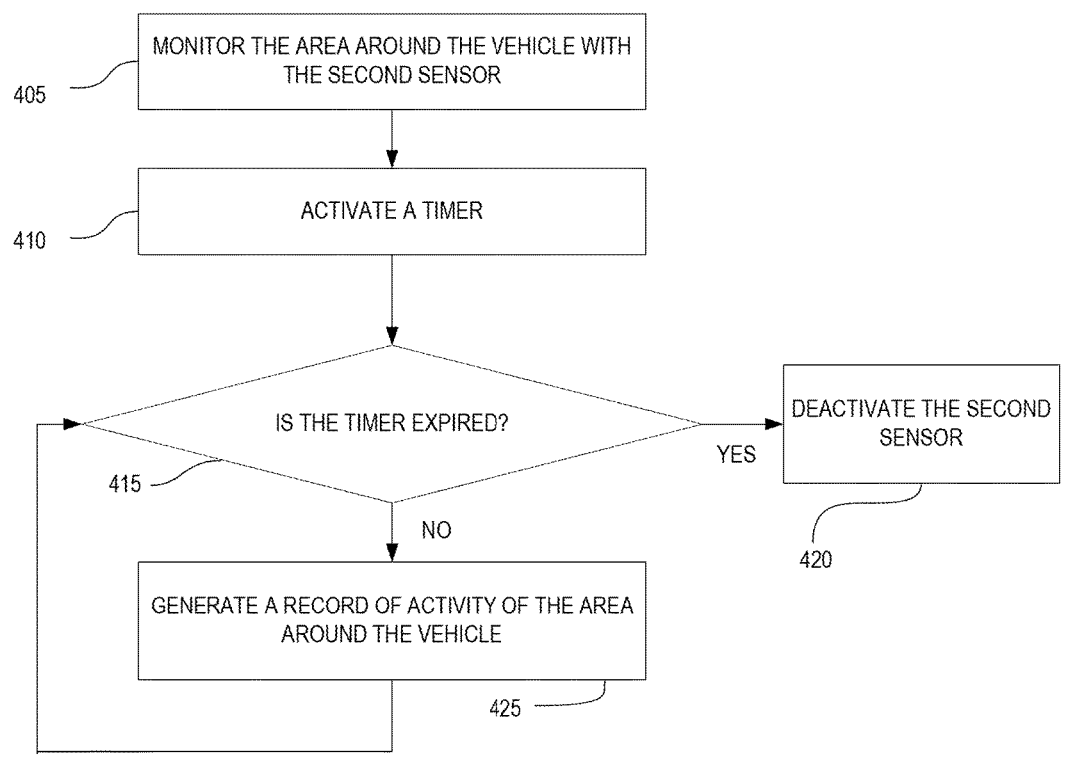
FIG. 4 is a flowchart of a method of operating the security system of FIG. 1 according to another embodiment.

FIG. 4 illustrates a method of monitoring the area local to the vehicle 100 for a predetermined period of time according to one example. In the example illustrated, the electronic processor 210 activates the second sensor 120 when it receives an input from the first sensor 115 indicating a trigger event (See block 320 of FIG. 3). Once the second sensor 120 is activated, the electronic processor 210 monitors the area around the vehicle 100 with the second sensor 120 (block 405). The electronic processor 210 then activates a timer for a predetermined and adjustable amount of time (block 410). In one instance, the timer may be adjusted based on preferences of the owner/operator. The electronic processor 210 then determines when the timer is expired (block 415). When the timer expires, the electronic processor 210 deactivates the second sensor 120 (block 420). In this instance, the first sensor 115 continues to monitor the vehicle 100 and may retrigger activation of the second sensor 120 upon another detection by the first sensor 115. When the timer has not yet expired, the electronic processor 210 generates a record of activity of the area around the vehicle 100 for as long as the second sensor 120 is active (block 425).

The record of activity may include images or video from the second sensor 120 taken of the area local to the vehicle. The record of activity is stored in the memory 215 of the electronic control unit 110 or in a database connected to the electronic control unit 110. Since the second sensor 120 is activated and the recording begins upon detection of a disturbance by the first sensor 115, the record may include events related to security of the vehicle 100 including a break-in attempt to the vehicle 100, a collision with the vehicle 100, vandalism of the vehicle 100, and others. The record of activity may include images or video of persons, vehicles, license plates, and other things that establish evidence related to the events listed above. The record of activity is captured up until the second sensor is deactivated.

In some embodiments, the electronic processor 210 may transmit a message to an owner of the vehicle 100 indicative of the alarm condition. In this instance, the owner may be located remotely from the vehicle 100. The electronic processor 210 may also transmit the record of activity to the owner of the vehicle 100 or to a monitoring service in real-time as the record is being made. The record may be transmitted via the communication module 130 to a communication device such as a cellular telephone, laptop, tablet, personal computer, and others. The communication device may include one or more user-selectable inputs that may be used to input commands into the security system 105 via the communication module 130. In some embodiments, the electronic processor 210 may transmit the record once the timer expires or upon a request received from the user-selectable input from the owner.

In some embodiments, the owner of the vehicle 100 or the monitoring service may receive the record of activity and may have the option to enter a response to control the security system 100. For example, in some embodiments, the communication module 130 may receive a request from the owner to disable the security system 105, to disable portions of the security system 105, or to turn off or on the alarm device 125 remotely.

Various features, advantages, and embodiments are set forth in the following claims.

What is claimed is:

1. A method of monitoring a vehicle for security, the method comprising:
   determining when a trigger event occurs to the vehicle based on a first input from a first sensor;
   activating a second sensor of the vehicle when the trigger event has occurred;
   determining, at an electronic processor, whether an alarm event has occurred based on a second input from the second sensor;
   generating a notification indicative of occurrence of the alarm event when the alarm event has occurred; and
   deactivating the second sensor of the vehicle when no alarm event has occurred.

2. The method according to claim 1, the method further comprising generating a record of activity of the area local to the vehicle with the second sensor when the trigger event occurs and until the second sensor is deactivated.

3. The method according to claim 1, wherein determining when the trigger event occurs to the vehicle based on the first input from the first sensor includes sensing a disturbance occurring to the vehicle with at least one of a group consisting of a vibration sensor and an acceleration sensor.

4. The method according to claim 1, wherein
   activating the second sensor of the vehicle when the trigger event occurs includes activating a video camera, and
   wherein determining, at the electronic processor, whether an alarm event has occurred based on a second input from the second sensor includes analyzing video from the video camera.

5. The method according to claim 4, wherein analyzing the video, with the electronic processor, includes determining locations of objects relative to the vehicle and when objects are located local to the vehicle, determine that the alarm event has occurred.

6. The method according to claim 4, wherein analyzing the video includes determining whether damage has occurred to the vehicle.

7. The method according to claim 1, wherein deactivating the second sensor occurs after a predetermined amount of time.

8. The method according to claim 1, wherein generating the notification indicative of the occurrence of the alarm event includes transmitting a message to an owner of the vehicle located remotely from the vehicle.

9. The method according to claim 8, the method further comprising receiving a user-selectable input from the owner of the vehicle in response to the message, the user-selectable input indicating a request to perform at least one action consisting of generating an audible alarm, turning off an audible alarm, and transmitting a record of activity of the area local to the vehicle to the owner.

10. A system for monitoring a vehicle for security comprising:
    a first sensor;
    a second sensor;
    an electronic processor communicatively connected to the first sensor and the second sensor, the electronic processor configured to
    determine when a trigger event occurs to the vehicle based on a first input from a first sensor;
    activate a second sensor of the vehicle when the trigger event has occurred;
    determine whether an alarm event has occurred based on a second input from the second sensor;
    generate a notification indicative of occurrence of the alarm event when the alarm event has occurred; and
    deactivate the second sensor of the vehicle when no alarm event has occurred.

11. The system according to claim 10, the system further comprising memory connected to the electronic processor, and wherein the electronic processor is configured to generate a record of activity of the area local to the vehicle with the second sensor when the trigger event occurs and until the second sensor is deactivated within the memory.

12. The system according to claim 10, wherein the electronic processor is configured to determine when the trigger event occurs to the vehicle based on the first input from the first sensor by sensing a disturbance occurring to the vehicle with at least one of a group consisting of a vibration sensor and an acceleration sensor.

13. The system according to claim 10, wherein the second sensor includes a video camera, and wherein the electronic processor is configured to
    activate the video camera when the trigger event occurs, and
    analyze video from the video camera to determine whether the alarm event has occurred.

14. The system according to claim 13, where the electronic processor is configured to determine locations of objects relative to the vehicle and when objects are located local to the vehicle, determine that the alarm event has occurred.

15. The system according to claim 14, wherein the electronic processor is configured to determine whether damage has occurred to the vehicle based on the first input.

16. The system according to claim 10, wherein the electronic processor is configured to deactivate the second sensor after a predetermined amount of time.

17. The system according to claim 10, wherein the electronic processor is configured to transmit a message to an owner of the vehicle located remotely from the vehicle.

18. The system according to claim 17, wherein the electronic processor is configured to receive a user-selectable input from the owner of the vehicle in response to the message, the user-selectable input indicating a request to perform at least one action consisting of generating an audible alarm, turning off an audible alarm, and transmitting a record of activity of the area local to the vehicle to the owner.

* * * * *